United States Patent
Goossens et al.

(10) Patent No.: US 12,014,622 B2
(45) Date of Patent: Jun. 18, 2024

(54) WAREHOUSE AUTOMATED CART PRIORITY NOTIFICATIONS

(71) Applicant: Ocado Innovation Limited, Hatfield (GB)

(72) Inventors: Spencer Goossens, Greenland, NH (US); Michael Crouch, Newbury, MA (US); Timothy Deignan, Watertown, MA (US)

(73) Assignee: Ocado Innovation Limited, Hatfield (GB)

( * ) Notice: Subject to any disclaimer, the term of this patent is extended or adjusted under 35 U.S.C. 154(b) by 273 days.

(21) Appl. No.: 17/670,249

(22) Filed: Feb. 11, 2022

(65) Prior Publication Data
US 2023/0260378 A1 Aug. 17, 2023

(51) Int. Cl.
| | |
|---|---|
| *G08B 7/06* | (2006.01) |
| *B60Q 9/00* | (2006.01) |
| *G05D 1/00* | (2006.01) |
| *G06Q 10/087* | (2023.01) |

(52) U.S. Cl.
CPC ............ *G08B 7/06* (2013.01); *B60Q 9/00* (2013.01); *G05D 1/0217* (2013.01); *G05D 1/0287* (2013.01); *G06Q 10/087* (2013.01)

(58) Field of Classification Search
CPC .......... G08B 7/06; B60Q 9/00; G05D 1/0217; G05D 1/0287; G05D 2201/0216; G06Q 10/087
See application file for complete search history.

(56) References Cited

U.S. PATENT DOCUMENTS

| | | | |
|---|---|---|---|
| 10,026,044 B1* | 7/2018 | Wurman | G06Q 10/08 |
| 2007/0021863 A1* | 1/2007 | Mountz | G06Q 10/087 |
| | | | 700/214 |
| 2023/0156158 A1* | 5/2023 | Moyne | G06V 20/52 |
| | | | 348/159 |

OTHER PUBLICATIONS

Examiner's Requisition for CA App. 3,170,095 dated Mar. 6, 2024 (5 pages).

* cited by examiner

*Primary Examiner* — Omeed Alizada
(74) *Attorney, Agent, or Firm* — FOLEY & LARDNER LLP (57) ABSTRACT

Disclosed are systems and methods for monitoring operations of autonomous vehicles within a warehouse. The autonomous vehicle's processing unit may detect when the autonomous vehicle is delayed based on one or more timers or time thresholds, such as an amount of time that the autonomous vehicle has been located at a particular location or the amount of time between when the autonomous vehicle received product picking instructions and a shipping deadline. The autonomous vehicle may also use various types of data to detect potential problems, such as determining an amount remaining battery life. Once the autonomous vehicle identified a particular triggering condition, then the autonomous vehicle may trigger an annunciator (e.g., flashing lights, sounding horn) or transmit a notification to other devices, such as client devices. The annunciators or notifications attempt to capture personnel attention to resolve the identifier problem.

19 Claims, 6 Drawing Sheets

WAREHOUSE AUTOMATED CART PRIORITY NOTIFICATIONS

TECHNICAL FIELD

This application relates generally to managing operations of autonomous vehicles in a warehouse, and, more particularly, providing notifications related to detected anomalies in the operations of particular autonomous vehicles.

BACKGROUND

Internet and mail orders have grown in popularity due to the convenience of being able to place an order and have it delivered to one's home or place of business. The need to be able to efficiently process an order including multiple items, collect the ordered items and arrange the ordered items into a group, e.g., in one or more totes corresponding to a customer order, for packaging is growing in importance. One approach to order processing involves the use of a robotic cart to lead a human around a warehouse. A human picker picks items from shelves and places them in one or more totes on the cart with, in some cases, different totes corresponding to different orders. Once the totes have been loaded by the human picker, the items in the totes are packaged for shipment to the individual or individuals who placed the order or orders to which the items in the tote correspond.

While attempts to fully automate order picking have been made, problems with robotic carts arise and causing delays and errors with warehouse operations, requiring human intervention. Quickly mitigating problems with a robotic cart reduces the delay in a current shipment, and helps avoid problems in later shipments.

BRIEF DESCRIPTION OF THE DRAWINGS

The accompanying drawings constitute a part of this specification and illustrate embodiments of the subject matter disclosed herein.

DETAILED DESCRIPTION

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

An autonomous vehicle ordinarily waits to complete a task of a job, such as meeting with a warehouse worker or picking a product from a storage location, before proceeding to the next task. In some circumstances, the autonomous vehicle may be delayed or wait too long to begin a task, resulting in late order shipments or battery drain. To avoid these issues, a processing unit of the autonomous vehicle may detect when the autonomous vehicle is delayed based on one or more timers or time thresholds or in jeopardy of missing a shipping deadline. Once the autonomous vehicle has waited beyond this threshold time, the autonomous vehicle or another device associated with the warehouse's operations (e.g., orchestration server, worker computers, worker mobile devices) may trigger an annunciator of the autonomous vehicle (e.g., flashing lights, sounding a siren, presenting a notification on a user interface), trigger one or more annunciators situated around the warehouse, or transmit notifications to client devices of the warehouse (e.g., worker computers, worker mobile devices, orchestrator device, other autonomous vehicles). The annunciator intends to notify nearby workers who can address a problem quickly or help expedite the autonomous vehicle's next job. The annunciator may be located on the autonomous vehicle (e.g., a light(s) positioned on the autonomous vehicle), on shelving near the autonomous vehicle, and/or on other fixtures or structure of the warehouse. The annunciator may indicate an urgency due to a shipping deadline, a low battery, a critically low battery, or other condition.

Autonomous vehicles receive job instructions from a controller and move to various locations around a warehouse. The autonomous vehicle travels to a location to meet a picker that pulls items from shelves and places the items on the autonomous vehicle. The autonomous vehicle automatically generates an acknowledgement or the picker manually inputs an acknowledgment before the autonomous vehicle moves to a next picking location or a packout station to unload the items for shipping. In some instances, the autonomous vehicle may wait for a long time for a picker to execute the job instructions. Waiting too long for the picker to tend to the autonomous vehicle may cause problems in warehouse operations and production. For instance, the battery of the autonomous vehicle may deplete its charge while waiting or the autonomous vehicle may miss a shipping deadline for a pick list.

I. Components and Operations of Illustrative Systems

Figure 1A:
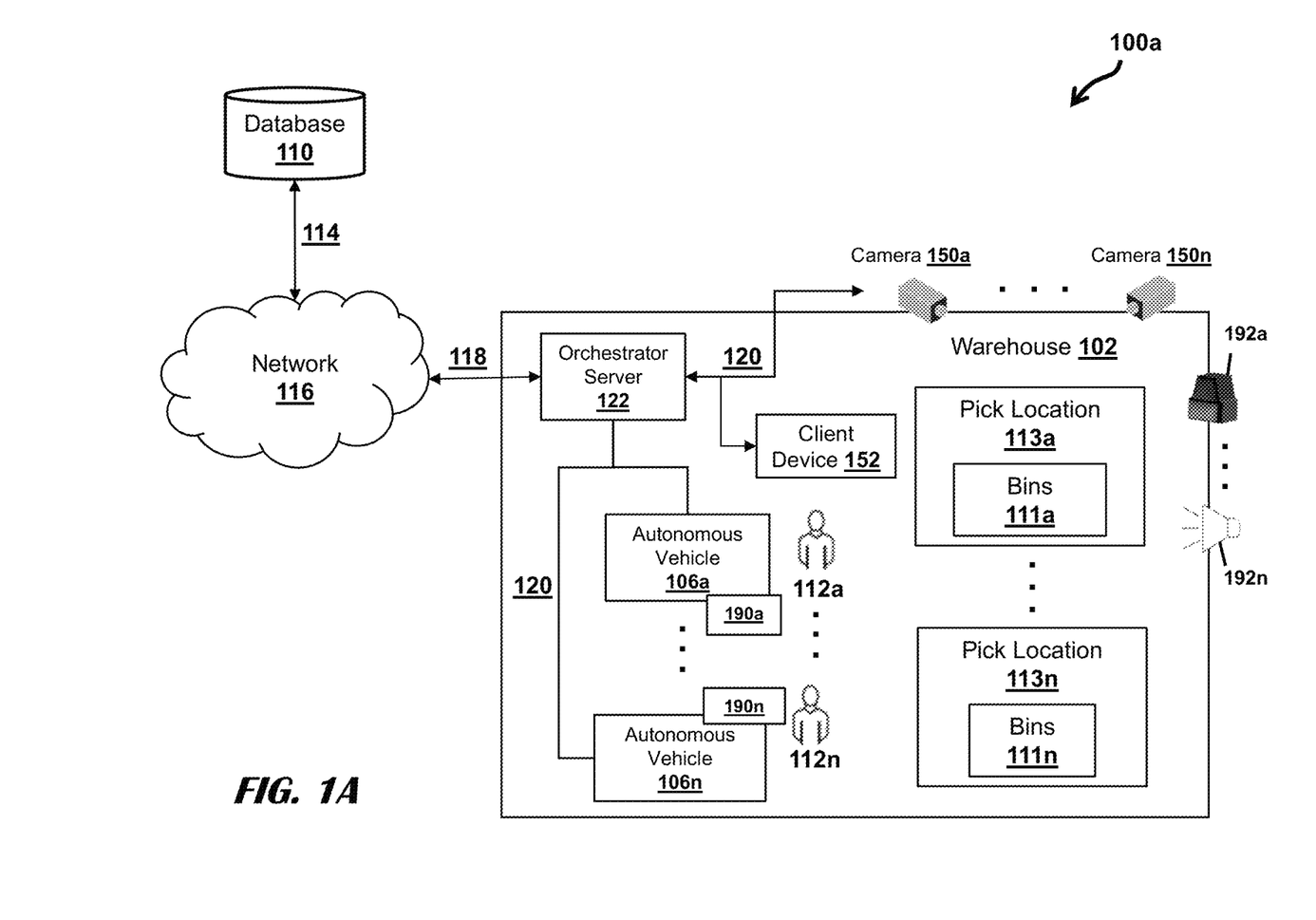
FIG. 1A illustrates a system for monitoring warehouse operations and order fulfillment, according to an embodiment.

FIG. 1A illustrates a system 100a for monitoring warehouse operations and order fulfillment, according to an embodiment. The system 100a includes one or more databases 110 connected to a communications network 116. The communications network 116 connects to an orchestrator server 122 associated with a warehouse 102. The warehouse 102 may contain autonomous vehicles 106a-106n (collectively referred to as autonomous vehicle(s) 106), pickers 112a-112n (collectively referred to as pickers 112), pick locations 113a-113n (collectively referred to as pick location(s) 113), product locations including shelves/racks/bins 111a-111n (collectively referred to as bin(s) 111), cameras 150a-150n (collectively referred to as camera(s) 150), one or more warehouse annunciators 192a-192n (collectively referred to as warehouse annunciator(s) 192), and any number of client devices 152 associated with pickers 112, managers, or other personnel of the warehouse 102. Embodiments may include or otherwise implement any number of devices capable of performing the various features described herein. For example, FIG. 1A shows the orchestrator server 122 as a distinct computing device in the warehouse 102. In some embodiments, the orchestrator server 122 may be located in a different warehouse or capable of communicating with orchestrator servers 122 in various warehouses 102. Embodiments may comprise additional or alternative components, or may omit certain components, and still fall within the scope of this disclosure.

Figure 1B:
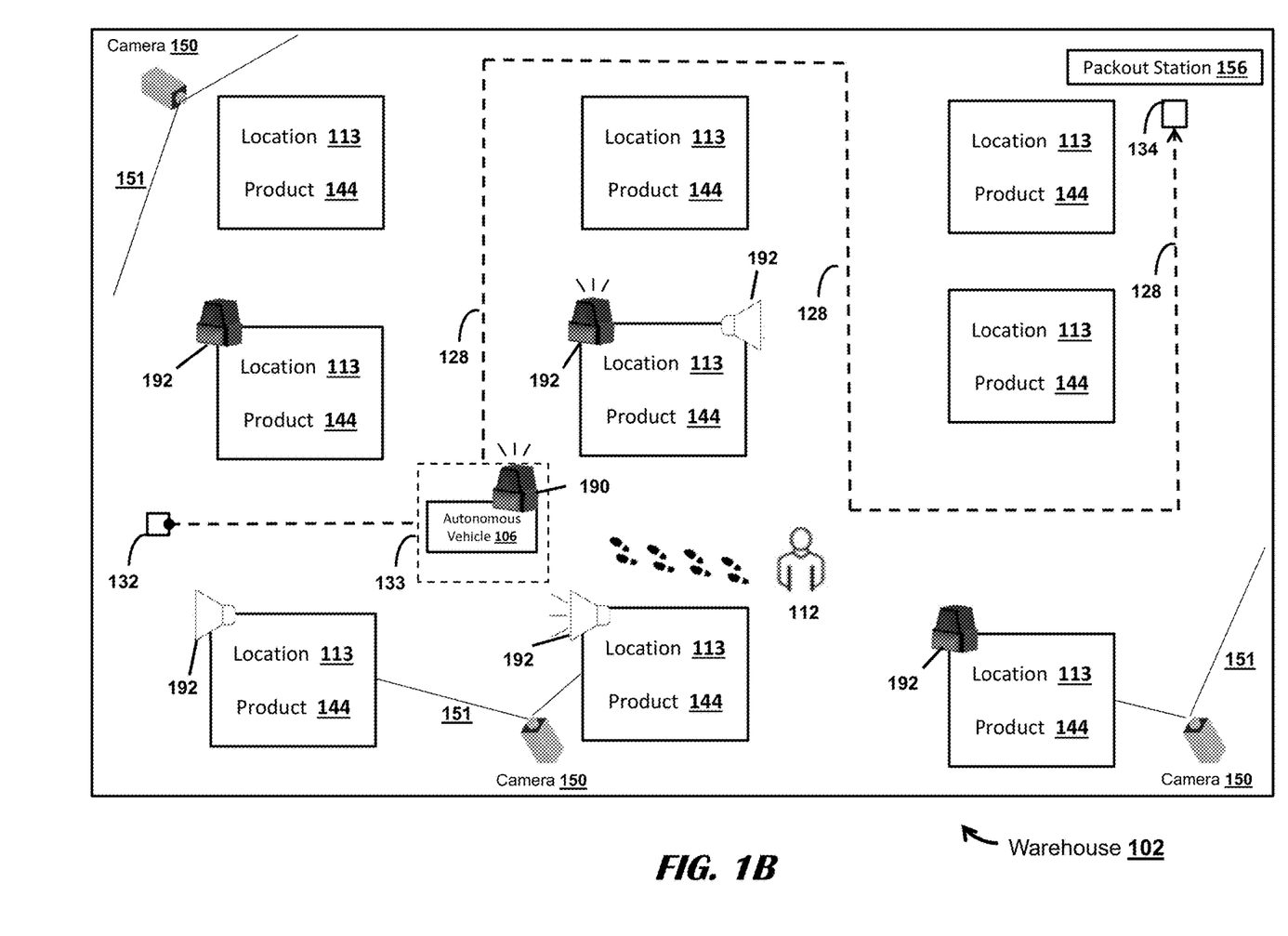
FIG. 1B illustrates a diagram of a pick path of an autonomous vehicle of the system through the warehouse, according to an embodiment.

FIG. 1B illustrates a diagram of a pick path 128 of an autonomous vehicle 106 through the warehouse 102 with various pick locations 113. One or more workers (e.g., picker 112) pick products 144 stored in bins 111 or shelves at particular locations 113 along the pick path 128 and load the picked products 144 on the autonomous vehicle 106. The picker 112 may travel with the autonomous vehicle 106 or the autonomous vehicle 106 may autonomously traverse the pick path 128 to a packout station 156, where a worker (e.g., picker 112, QA worker, manager) unloads, reviews, and packs the products 144 on the autonomous vehicle 106 for shipping. The picker 112 or other worker may also travel with the autonomous vehicle re-routed to a healing station, when the autonomous vehicle 106 contains a product 144 associated with an exception and rerouted for further review by the QA worker, manager, or other worker.

The orchestrator server 122 and the autonomous vehicles 106 may be configured for robotics to replace or assist the pickers 112. The robotic autonomous vehicle 106 may move autonomously throughout the warehouse 102 or storage facility. When moving autonomously, the autonomous vehicle 106 can move alongside the picker 112 or independently of the picker 112 to locations 113 in the warehouse 102. The robotic autonomous vehicle 106 may pick products 144 from bins 111 or shelves and load the picked products 144 onto the autonomous vehicle 106.

The autonomous vehicles 106 are located in the warehouse 102 and controlled by the orchestrator server 122 via the communications link 120. Pickers 112 may work alongside the autonomous vehicles 106 to perform operations, such as picking the products 144 from the bins 111 in the warehouse 102 and placing those products 144 in the autonomous vehicle 106, replenishing bins 111 in the warehouse 102 by stocking products 144 on the bins 111 using the products 144 in an autonomous vehicle 106, and removing products from the autonomous vehicle 106 such that the products may be unloaded and packaged for shipping. The autonomous vehicle 106 is robotic and has autonomous operation based on instructions communicated from the orchestrator server 122. In some embodiments, the autonomous vehicle 106 may be manually operated by the picker 112, who may push, pull, drive, or otherwise move the autonomous vehicle 106 around the warehouse 102. For example, the autonomous vehicle 106 may have a shopping cart configuration. Even when manually-operated, the autonomous vehicle 106 may still use other components for communicating with the orchestrator server 122 and the picker 112, such as a screen of computing device or other user interface for communicating information to the picker 112 from the orchestrator server 122.

The databases 110 store and manage data records of various products 144 or other information about warehouse 102 operations. For example, the database 110 may store product quantities, product locations, product shipping schedules, product manufacturer information, and the like. The products in the warehouse 102 may be collected, loaded, unloaded, moved, stored, or otherwise transferred at various areas for points of transfer within the warehouse 102 along the pick path 128. In some cases, the pick path 128 includes areas where the autonomous vehicle meets with a worker to manually pick the product 144. The database 110 may also store data records of various types of data indicating a quantity of a product and a location of a product in the warehouse (e.g., in a bin 111 at a particular pick location 113). The pick locations 113 may contain bins 111 of one particular product 144 or of multiple products 144. The database 110 may also store and manage data records of about the storage locations (e.g., shelves, aisles, bins 111) and images (e.g., product image, barcodes) of product inventory within the warehouse 102.

The data records of the database 110 may include information about customers, who may be merchants or purchasers. Customer information may include, for example, identifying information, shipping information, and contact information. The customer information may further include information related to service level agreement (SLA) expectations established between the warehouse 102 and a particular customer, such as expected shipping times and expected delivery times, among other standards.

The database 110 may further contain information about the cameras 150. The data records about the camera 150 may indicate the properties of the camera 150, including any number of extrinsic properties (e.g., location, orientation of the camera 150) and any number of intrinsic properties for relating or mapping camera coordinates or pixel coordinates in the image or video frame (e.g., camera's 150 field of view 151 within the warehouse 102). The database 110 receives and stores data streams of media data (e.g., video, audiovisual, still image) from each camera 150, which the database 110 may receive directly or via the orchestrator server 122.

The orchestrator server 122 may update data records in the database 110 in real time (or near real time) as products are being stocked and picked from pick locations 113 (including bins 111) in warehouse 102. Additionally or alternatively, the orchestrator server 122 may update data records in database 110 periodically (e.g., daily, monthly, quarterly). In some configurations, data records in database 110 are updated in response to trigger conditions. For example, a triggering condition arises when a shipment of a particular product arrives at the warehouse 102, at which time a product is identified by a picker 112 as being out of stock.

The database 110 is coupled via communications links 114, to communications network 116, and via communications link 118 to the orchestrator server 122 or other devices associated with the warehouse 102 (e.g., client devices 152, autonomous vehicles 106). The communications network 116 may be a public or private network, and the communications links 114, and 118 that connect to communications network 116 may be wired or wireless. Non-limiting examples of the communications network may include: Local Area Network (LAN), Wireless Local Area Network (WLAN), Metropolitan Area Network (MAN), Wide Area Network (WAN), and the Internet. The communication over the network may be performed in accordance with various communication protocols, such as Transmission Control Protocol and Internet Protocol (TCP/IP), User Datagram Protocol (UDP), and IEEE communication protocols. Similarly, the orchestrator server 122 is coupled to the autonomous vehicles 106, cameras 150, warehouse annunciators 192, and client devices 152 via communication links 120. The communication links 120 may be a public or private network, and may be wired or wireless. Non-limiting examples of the communication links 120 may include: Local Area Network (LAN), Wireless Local Area Network (WLAN), Metropolitan Area Network (MAN), Wide Area Network (WAN), and the Internet. The communication over the communication links 120 may be performed in accordance with various communication protocols, such as Transmission Control Protocol and Internet Protocol (TCP/IP), User Datagram Protocol (UDP), and IEEE communication protocols.

The orchestrator server 122 is associated with the warehouse 102 and may be physically located at the warehouse 102 or located remotely from the warehouse 102. In the schematic embodiment shown in FIG. 1A, the orchestrator server 122 is shown as being located in the warehouse 102, which may represent a physical and/or remote location of the orchestrator server 122 or functionality, though the orchestrator server 122 may be located in a remote location. The orchestrator server 122 may be implemented as a distributed system or as a single device. In the case of a distributed system, one or more processors located outside the warehouse 102 or in other devices may be, and sometimes are, used to perform one or more operations attributed to the orchestrator server 122 in this embodiment. In the case of one or more computing devices or processors operating as the orchestrator server 122, the processors may be located within or outside of the warehouse 102 and perform the various operations attributed to the orchestrator server 122 in this embodiment.

The orchestrator server 122 may generate instructions (sometimes called pick instructions) for the autonomous vehicles 106 to retrieve one or more products 144 in the bins 111 from one or more pick locations 113 to complete an order or request from a customer (e.g., online order, pick list, customer's list, grocery list, shopping list). When the orchestrator server 122 receives an indication that a product in an order has shorted, the orchestrator server 122 may query the database 110 and retrieve pick locations 113 that store the same product. The orchestrator server 122 will instruct the picker to pick the product 144 at the new pick location 113 by updating the pick path 128. Additionally or alternatively, the orchestrator server 122 may query the database 110 and retrieve other substitute products 144 (and substitute product locations 113) to replace the product 114 that has been shorted and update the pick path 128. Additionally or alternatively, the orchestrator server 122 may store a lookup table in local memory mapping acceptable substitute products 144 of particular products 144, alternate pick locations 113 of particular products 113, and the like. The instructions can indicate a pick path 128 to the autonomous vehicle 106, indicating the locations 113 within the warehouse 102 for the picker 112 to find and collect products 144 for orders according to an order list received from the orchestrator server 122.

The orchestrator server 122 may reference the customer information stored in the database 104 when generating the instructions for the autonomous vehicle 106. The orchestrator server 122 may generate the instructions to include parameters for detecting triggering conditions indicating problems with performing the instructions and/or include a priority level for the instructions. The orchestrator server 122 may determine the triggering condition parameters or the priority level based upon certain types of customer information in the database 104 or other user inputs. The autonomous vehicle 106 may monitor timers and/or various data inputs, such as data inputs indicating progress of the autonomous vehicle 106 and the picker 112 traversing the pick path 128 and picking products 144 of the customer order. The orchestrator server 122 may obtain the priority of a task or a job by receiving instructions expressly indicating the priority from another device or as input from a user, or by automatically determining the priority based upon data indicating the priority or the parameters for detecting triggering conditions. Additionally or alternatively, a processor of the autonomous vehicle 106 may obtain the priority of a task or a job by receiving instructions expressly indicating the priority from another device (e.g., orchestrator server 122) or as an input from a user (e.g., picker), or by automatically determining the priority based upon data indicating the priority or the parameters for detecting triggering conditions The autonomous vehicle 106 may perform various notification operations or mitigation operations in response to determining that the triggering condition parameters satisfy certain trigger conditions (e.g., one or more thresholds). The triggering conditions indicated by the instructions or preconfigured within the autonomous vehicle 106 may instruct or otherwise trigger the autonomous vehicle 106 to perform one or more operations according to a determined priority level associated with the autonomous vehicle 106. For example, when the autonomous vehicle 106 determines that the priority level satisfies a high-priority threshold level (indicating the customer order or the autonomous vehicle 106 is a high priority), the autonomous vehicle 106 may perform pre-configured operations for servicing high-priority customer orders, notifying the workers of the high priority status of the autonomous vehicle 106, and/or mitigating problems associated with the autonomous vehicle 106 or the customer order. For instance, the autonomous vehicle 106 may trigger one or more autonomous vehicle annunciators 190a-190n (collectively referred to as vehicle annunciators 190) (e.g., flashing lights, sound horn) coupled to the autonomous vehicle 106, thereby notifying the pickers 112. In some cases, the autonomous vehicle 106 may further generate and transmit notifications to a display screen of the autonomous vehicle 106 or additional devices of the warehouse 102, such as a client device 152 or orchestrator server 122.

In some embodiments, the warehouse 102 includes various warehouse annunciators 192 situated around the warehouse 102 (e.g., on a shelf, pillar, ceiling, wall, floor, other fixture). The autonomous vehicle 106 may generate and transmit a notification to the orchestrator server 122 indicating the increased priority or the problem with the autonomous vehicle 106 and the orchestrator server 122. The orchestrator server 122 determines a current location of the autonomous vehicle 106 and a set of one or more warehouse annunciators 192 situated nearby the autonomous vehicle 106. The orchestrator server 122 then transmits instructions to the set of nearby warehouse annunciators 192 to begin operating (e.g., emitting flashing lights (strobe) or non-flashing lights; sounding siren, horn, buzzer, beep). Additionally or alternatively, the autonomous vehicle 106 identifies the set of warehouse annunciators 192 nearby the autonomous vehicle 106 and transmits instructions to the set of nearby warehouse annunciators 192 to begin operating.

The triggering conditions may be time-related, priority-related, or a combination thereof. Time-related conditions may be based on timers and timer thresholds monitored by a processing unit of the autonomous vehicle 106, the orchestrator server 122, or other device. The autonomous vehicle 106 may detect that the autonomous vehicle 106 is delayed in performing a particular instruction based on the one or more timers, a timestamp of when the instructions were received from the orchestrator server 122, and/or a current time, among other potential time-related values. Non-limiting examples of timers to detect a delay may include: a general timer or dwell timer that the autonomous vehicle 106 (or other device) starts when the autonomous vehicle 106 arrives at a picking location 113 or the meet location 133; a shipping-deadline timer specific to the customer order being fulfilled by the autonomous vehicle 106, where the time relates to a shipping deadline for a courier shipping the products 144 to be picked for the particular customer order; a service timer specific to the customer order being fulfilled by the autonomous vehicle 106, where the service timer relates to the customer's service level agreement (SLA) expectation; and a battery life-timer related to the remaining battery level of the autonomous vehicle 106. The autonomous vehicle 106 may include any number of these timers, additional timers, or alternative timers.

The autonomous vehicle 106 may determine whether to perform the notification or mitigation operations based upon the timers. For example, the autonomous vehicle 106 may trigger the autonomous vehicle annunciator 190 and/or warehouse annunciators 192, and in some cases escalate the job's priority, at the start location 132 (e.g., staging) or the meeting location 133, if the autonomous vehicle 106 determines the autonomous vehicle 106 received the instructions for the job, or arrived at the meeting location 133, shortly before (within a threshold) to an imminent deadline (e.g., SLA deadline, shipping deadline). As another example, the autonomous vehicle 106 may trigger the various annunciators 190, 192 if the autonomous vehicle 106 determines that the battery life timer satisfies a battery-time threshold. A battery life may be measured using current integration or a voltage. The measurement may be transformed into a value representative of a time remaining until no charge or a minimum (threshold) charge.

The priority-related conditions may be based on the priority of completing the instructions and tasks for fulfilling the customer order. The orchestrator server 122, autonomous vehicle 106, or other device, may determine the priority for the customer order and assign that priority level to the autonomous vehicle 106 performing the instructions for the customer order. In some configurations, certain timer-related data may inform or be a component that the autonomous vehicle 106 or orchestrator server 122 references to determine the priority. For example, the priority conditions could be based upon and indicate, for example, that the accumulated time during which the autonomous vehicle was assigned a particular operational status (e.g., stationary, location, in motion, high priority status, default priority status, low priority status, non-operational error status, low battery, high battery temperature (e.g., threshold at 40° C., 50° C., 60° C.) now exceeds a particular status accumulation threshold. Additionally or alternatively, the operational status may be based on factors external to the autonomous vehicle, such as a smoke alarm activation or a detection of an unconscious or injured person.

In some cases, the same device that determined and assigned the priority level (e.g., the orchestrator server 122) or a different device (e.g., the autonomous vehicle 106) may later determine an adjustment (e.g., escalate or deescalate) to the priority level associated with the autonomous vehicle 106 based on data inputs automatically generated by autonomous vehicle 106 or inputted by the picker 112, such as automatically or manually generated inputs indicating that a particular product 144 was picked and loaded on the autonomous vehicle 106. As an example of adjusting the priority level, for a typical customer order the orchestrator server 122 or the autonomous vehicle 106 may determine that the customer order's priority is a default priority at a staging location (e.g., start location 132) and set a priority level for the autonomous vehicle 106 according to the instructions. However, the autonomous vehicle 106 or another device (e.g., orchestrator server 122, client device 152) may adjust the priority level at any point or time while the autonomous vehicle 106 is fulfilling the customer order, from the start location 132 to the packout station 156.

Additionally or alternatively, the priority-related condition may indicate a problem with the autonomous vehicle 106 or the products 144 of the customer order. For example, the autonomous vehicle 106 may measure the amount of battery-life remaining that the autonomous vehicle 106 compares against a pre-configured battery-life threshold. The autonomous vehicle 106 may escalate the priority and/or perform the notification or mitigation operations when the autonomous vehicle 106 determines that the battery-life satisfies the battery-life threshold. For example, the autonomous vehicle 106 may trigger the autonomous vehicle annunciators 290 and transmit a notification to the orchestrator server 122. The orchestrator server 122 may transmit notifications to the client devices 154 of various pickers 112 or a set of nearby warehouse annunciators 290. Additionally or alternatively, the orchestrator server 122 may generate and transmit substitute instructions to a substitute autonomous vehicle 106 to proceed to the meet location 133, activate the autonomous vehicle annunciators 190 (instead of or in addition to the original autonomous vehicle annunciators) of other autonomous vehicles 106, and/or to display the notification on the user interface of the other autonomous vehicles 106. In one example, an annunciator of a substitute autonomous vehicle may flash lights when the substitute autonomous vehicle is nearby (e.g., within a distance threshold) to the original autonomous vehicle.

In some implementations, the autonomous vehicle 106 (or other device) determines whether to perform the notification operations (e.g., annunciator operations) and/or mitigation operations based upon both the time-related conditions and the priority-related conditions. For example, in an embodiment, before triggering the annunciators 190, 192 or performing other mitigation operations, the autonomous vehicle 106 may monitor whether a first condition related to a timer is satisfied, and then the autonomous vehicle 106 (or other device) determines whether a second condition related to priorities is satisfied. In this stepped approach, the autonomous vehicle 106 may trigger the annunciator 190, 192 when the autonomous vehicle 106 detects both conditions in sequence. For example, the autonomous vehicle 106 may monitor the dwell timer related to an amount of time that the autonomous vehicle 106 is located at a particular location of the warehouse 102 and may determine that the autonomous vehicle 106 has been stationary for too long once the dwell timer exceeds a corresponding stationary threshold. If so, then the autonomous vehicle 106 monitors the priority level. The autonomous vehicle 106 triggers one or more annunciators 190, 192 in response to the autonomous vehicle 106 or orchestrator server 122 escalating the job's priority. For instance, the autonomous vehicle 106 may escalate the priority and triggers the annunciators 190, 192 in response to determining that the autonomous vehicle's 106 battery life timer exceeds a threshold or determining that the current time is approaching (within a threshold distance) to the job's imminent shipping or SLA deadline. In this example, the autonomous vehicle 106 may trigger flashing lights and sirens of the autonomous vehicle annunciator 190 or the nearby warehouse annunciators 192, the autonomous vehicle 106 having a dying battery or in danger of missing the deadline (e.g., SLA deadline, shipping deadline).

In some cases, the autonomous vehicle annunciator 190 may perform escalated operations with increasing intensity. For example, the autonomous vehicle annunciators 190 may begin with a less urgent notification, such as a period beep, when the battery life remaining or the battery timer satisfies a less urgent threshold. The autonomous vehicle annunciator 190 may perform annunciator operations with ever-increasing intensity (e.g., increase frequency of beeps as urgency increases or utilize a different/additional annunciator as urgency increases).

In some configurations, the autonomous vehicle annunciators 190 and warehouse annunciators 192 continue operating until halted by a user or other device. The autonomous vehicle 106 or other device may cease the annunciator 190, 192 operations and/or de-escalate the priority level automatically or in response to a worker's input. For example, the worker may enter an input at a user interface of the autonomous vehicle 106 or client device 152 that indicates or acknowledges that the triggering conditions that triggered the annunciator 190, 192 operations are resolved. For instance, the autonomous vehicle 106 may be directed to the meeting location 133 to meet with the picker 112. If the picker 112 takes too long, then the autonomous vehicle 106 may determine that the dwell timer satisfies a dwell threshold, and triggers the annunciator 190, 192 and/or escalates the priority of the autonomous vehicle 106. The picker 112 may enter an input into the user interface indicating the picker 112 has met with the autonomous vehicle 106 (e.g., entered a passcode, scanned a barcode identifier of the picker 112) or performed a manual pick operation, thereby indicating that the autonomous vehicle 106 is tended to by the picker 112 and the job is progressing. Additionally or alternatively, the autonomous vehicle 106 may determine that a particular timer threshold has been satisfied and cease operations of the annunciators 190, 192. For instance, the autonomous vehicle 106 may determine that the autonomous vehicle 106 has moved or started to move to a next location 113 and that the dwell timer does not exceed the corresponding threshold. As another example, the autonomous vehicle 106 may generate or receive an acknowledgement that the task of the job (e.g., pick) was accomplished.

The autonomous vehicle 106 may communicate with the orchestrator server 122 and/or the database 110. The autonomous vehicle 106 receives instructions from the orchestrator server 122 and executes the instructions to route the autonomous vehicle 106 and/or the picker 112 to particular pick locations 113 or meet locations 133 in the warehouse 102. The orchestrator server 122 may cause instructions to display on a user interface of the autonomous vehicle 106 or the GUI of the client device 152. Additionally or alternatively, pickers 112 may utilize the client device 152, such as a mobile device or wearable device (e.g., earpiece, glasses, watch, wrist computer), to receive instructions and/or the notification from the orchestrator server 122. In other embodiments, the autonomous vehicles 106 receive instructions and/or notifications from the orchestrator server 122 and transmit the instructions and/or notification to the client devices 152 of the pickers 112. For example, the client device 152 of the picker 112 may receive a notification from the orchestrator server 122 or the autonomous vehicle 106 instructing the picker 112 to rendezvous with the autonomous vehicle 106 at the meet location 133 to perform one or more picks, or an alert notification indicating that the autonomous vehicle 106 is delayed, is low on power, or received an elevated priority.

The instructions may indicate the pick path 128 (e.g., route) to pick products, location data identifying one or more locations (e.g., pick locations 113, bins 111 at a pick location 113) to pick products, product data identifying one or more products to be picked from particular bins 111, and corresponding order information (e.g., which products go in which containers/portions of containers on the autonomous vehicle 106). The various types of data (e.g., product data, media data, storage location data, autonomous vehicle data, camera data) that include fields that indicate, for example, a product identifier, media data, a scan of the product identifier, an product image, a bin identifier associated with the product (e.g. identifier of an inventory bin within which the product is stored on a warehouse shelf, or identifier of a tote bin within which the product is transported on an autonomous vehicle), an autonomous vehicle identifier for the autonomous vehicle, a worker identifier, a worker image, camera identifiers, and one or more timestamps, among others. The instructions may include various types of tasks for the autonomous vehicle 106 and/or the picker 112 to perform. The instructions may, for example, instruct the autonomous vehicle 106 to pick at least one product 144 (e.g., from a bin 111 at a location 113). As another example, the instructions may instruct the autonomous vehicle 106 and the picker 112 to meet at the meet location 133.

The autonomous vehicle 106 may receive instructions from the orchestrator server 122 and, in some embodiments, display the pick path 128 to the picker 112 assigned to the autonomous vehicle 106. The instructions routing the autonomous vehicle 106 may indicate an order (e.g., a sequence) to perform or display tasks at various places on the pick path 128 or within the warehouse 102, such that the tasks for individual products are provided, displayed (via the user interface on the autonomous vehicle 106), and/or performed sequentially. The instructions may interleave picking products 144 of various different customer orders (e.g., lists of purchased products for particular customers) to minimize the time for pickers 112 to pick products in the warehouse 102. The autonomous vehicle 106 may display, using the instructions, one individual task at a time as a picker 112 progresses through the path such that upon completion of a first task (e.g., first product 144 at a first bin 111*a* at a first pick location 113*a*), the autonomous vehicle 106 displays a second task (e.g., a second product at a second bin 111*b* at the first pick location 113*a*, or a second product 144 at a second bin 111*b* at a second pick location 113*b*).

While the picker 112 is being routed to a pick path 128, the orchestrator server 122 can dynamically revise (re-route) the pick path 128, for example, in response to a product being unavailable (e.g., shorted), and to incorporate an alternate pick location 113 in the pick path 128 (e.g., a product may be restocked at an alternate pick location, the alternate pick location may have surplus products). Additionally or alternatively, the orchestrator server 122 may incorporate a substitute product 144 (e.g., at an alternate pick location 113) in the pick path 128. The orchestrator server 122 may dynamically revise the pick path 128 to an alternate pick location 113 based in part on one or more completion scores of multiple orders on the autonomous vehicle 106, a distance to the alternate pick location 113, a time to traverse to the alternate pick location 113, a priority of orders on the autonomous vehicle 106, and the like.

In some configurations, the orchestrator server 122 determines one or more acceptable substitute products, if a particular product is short in inventory. In determining acceptable substitute products, the orchestrator server 122 calculates acceptance probability scores (e.g., a likelihood that the user and/or customer will accept or agree to the available substitute product). The orchestrator server 122 may algorithmically or statistically determine acceptance probability scores using, for example, products, product classes, data associated with previous substitutions accepted by a user or group of users, previous substitutions accepted by one or more other users (e.g., similar users, group profile), and/or product ranking data. The orchestrator server 122 can generate weighted scores for products and substitute products. The weighted score may include a combination of a distance metric and an acceptance probability score for a product and substitute product. The orchestrator server 122 can determine and assign a weight value to the distance metric, acceptance probability score and/or product characteristics based in part on user preferences, store or retailer preferences and/or the characteristics of the missing product.

The autonomous vehicle 106 may communicate with the orchestrator server 122 to provide product status information (e.g., exception indicators, whether a product at a pick location 113 has shorted), completion of tasks (e.g., product picks) associated with the pick path 128, and receive routing instructions for navigating through the warehouse 102 to bins 111 at pick locations 113. In some configurations, the autonomous vehicle 106 may communicate with the database 110 to provide offline access to inventory data, product data, and/or substitute product data. The orchestrator server 122 may measure completion (fulfillment) of an order based on various order attributes. In one configuration, completion of an order occurs when the order has arrived at a packing station so that the order can be packaged for a delivery service. In another configuration, completion of an order occurs when an autonomous vehicle 106 has completed the pick path 128.

The orchestrator server 122 also communicates with databases 110, autonomous vehicles 106, and client devices 152 associated with pickers 112 (e.g., mobile phones, personal data assistants (PDA), tablet computers, handheld scanners, or wearable devices). The communications may include retrieving, updating, and routing (or re-routing) the autonomous vehicles 106, exchanging media data, and communicating instructions associated with managing the media data. The orchestrator server 122 may monitor the order fulfillment and track the product inventory within the warehouse 102, which includes receiving the media streams from the cameras 150 and performing various operations for particular footage or segments of interest in the media data of certain cameras 150. The cameras 150 are situated throughout the warehouse 102. Optionally, a camera 150 may be situated on or be a component of the autonomous vehicle 106.

The client device 152 may be any computing device capable of displaying information to pickers 112 or other users of the system 100*a*. The client device 152 may include software programming for receiving, displaying, and navigating the display of the media data. The client device 152 may further provide various instructions or queries to the orchestrator server 122 or database 110, including user instructions confirming to the orchestrator server 122 that a particular segment of media is indeed associated with an exception (e.g., captured footage of misplaced inventory, captured footage of theft).

The orchestrator server 122 receives certain types of information before or along with receiving the exception, which the orchestrator server 122 uses to detect the exception or perform certain responsive tasks. The orchestrator server 122 can additionally or alternatively use the information received from the cameras 150 or other devices (e.g., client device 152) of the system 100*a* to cross-reference (or correlate) with other information stored in the database 110. For instance, the orchestrator server 122 can cross-reference the product data indicating the location 113 or the bin 111 of the product 144 against camera data containing camera information indicating the products 144 or bins 111 that are situated in or traverse the cameras' 150 field of view 151.

The database 110 may store camera data records for each of the cameras 150 and product data for each of the products 144. The camera data for a particular camera 150 may include, for example, the camera information indicating the locations 113, bins 111, and/or products 144 situated in or having a pick path 128 traversing the particular camera's 150 field of view 151. The product data may include, for example, the product information indicating the location 113, bin 111, and/or the pick path 128 for the particular product 144. In response to an exception or at a preconfigured time interval, the orchestrator server 122 may reference the database 110 and correlates the camera data and the product data to determine one or more data intersections between the camera data and product data. Using these data intersections, the orchestrator server 122 may identify the set of target cameras 150 that potentially generated media data including footage of the particular product 144. The orchestrator server 122 may then perform further operations associated with the media data generated by this identified set of target cameras 150. For instance, the orchestrator server 122 may cross-reference and correlate the camera data for the plurality of cameras 150 of the warehouse 102 against the product data for a particular product 144, such as the product 144 associated with an exception received by the orchestrator server 122. For each particular camera 150, the orchestrator server 122 may correlate the product data of the product 144 (e.g., location 113, bin 111, and/or the pick path 128 for the particular product 144) against the camera data of the particular camera 150 (e.g., locations 113, bins 111, products 144 situated in or having a pick path 128 traversing the particular camera's 150 field of view 151). Based upon these correlations, the orchestrator server 122 may determine instances of data intersections where the camera data of particular cameras 150 intersect with the product data. For example, the camera data may expressly indicate that the product 144 is in the camera's 150 field of view 151. As another example, the camera data may indicate the location 113, bin 111, or pick path 128 in the camera's field of view 151 matches or otherwise corresponds to the location 113, bin 111, or pick path 128 of the product 144 in the product data. The orchestrator server 150 may identify the set of target cameras 150 based upon the camera data having the data intersections with the product data.

With reference to FIG. 1B, the pick path 128 can include or correspond to an original or initial path generated based on the pick locations 113 of products of one or more orders. The pick path 128 can provide the route through the warehouse 102 for the autonomous vehicle 106 to follow, and select or retrieve the corresponding products 144 of the order list received from the orchestrator server 122. The pick path 128 may correspond to a minimal or smallest total distance for the autonomous vehicle 106 to travel through the warehouse 102 to select and/or retrieve the product 144 for one or more orders from the various pick locations 113 within the warehouse 102. The autonomous vehicle 106 can execute the instructions to collect the product 144 in a determined ordering, for example, sequential order based in part on a position with the pick path 128, a current location 150 in the warehouse 102, and/or a location 113 of the product 144.

The cameras 150 may include fixed or mobile cameras 150, situated around the warehouse 102 or coupled to the autonomous vehicle 106. Each camera 150 generates media data containing various types of digital media (e.g., video, audiovisual, still image), which the camera 150 transmits as a data stream to the orchestrator server 122 or the database 110 via one or more communications links 118, 120. The media data includes footage captured by the camera 150 within the field of view of the particular camera 150. The media data generated by the camera 150 may include metadata indicating aspects of the media data. For instance, the media data may include timestamp metadata that may correspond to timestamps contained within the exception indicators generated when fulfilling orders.

Each camera 150 may include the field of view 151. Field of view 151 is illustrated in FIG. 1B as having an angle, but the field of view 151 from camera 150 may have a 360 degree view. The camera 150 may be positioned so that field of view 151 focuses on one or more aisles, shelves, containers, autonomous vehicles, areas, stations, pickers, or other objects. In one example, the field of view may include a portion of a shelf, and the orchestrator server may analyze media data from the camera to detect when a picker reaches for a particular product in that portion of the shelf. In another example, the autonomous vehicle may have a camera having a field of view that changes as the autonomous vehicle traverses the warehouse, and the orchestrator server may analyze media data from the camera to detect when a picker reaches for a particular product in that portion of the shelf.

The autonomous vehicle 106 can execute instructions for a first location 113 for a first product 144 and wait to execute instructions for a second location 113 for a second product 144 until the autonomous vehicle 106 receives an indication that the first product 144 has been picked. Additionally or alternatively, the autonomous vehicle 106 may receive an indication that the first product 144 is unavailable and/or damaged. The pick path 128 can include a starting point 132 and an end point 134 with each of the pick locations 113 at different points along the path 128. The packout station 156 is situated at or near the end point 134, which includes a client device 152 operated by a packout user who performs a quality control review of the inventory on the autonomous vehicle 106, and then packs and ships the products 144 from the autonomous vehicle 106 to the destination. It should be appreciated that the pick path 128 can include a single location 113 or multiple locations 113 (e.g., two or more) with the number of pick locations 113 determined based in part on a number of products 144 picked for one or more orders.

The autonomous vehicle 106 can execute the instructions and traverse the pick path 128 selecting and retrieving the corresponding products 144 from the respective locations 113. In some circumstances, the orchestrator server 122 receives the indication of the exception associated with a product along the pick path 128, which may be manually inputted at the client device 152 or automatically detected by a device in the system 100a. The exception indicates an issue associated with a particular product 144 of the order, such as an incorrect product 144 being picked and added to the autonomous vehicle 106 or that the product 144 is missing from the order fulfillment.

The picker 112 or worker at the packout station 156 may manually generate the exception by entering one or more exception commands into the GUI of the client device 152. For example, during order fulfillment, the picker 112 picks the products 144 from a bin 111 and places the product 144 onto the autonomous vehicle 106, which follows the pick path 128 to deliver the products to the packout station 156 for boxing and shipping. In this example, the QA worker at the packout station 156 evaluates the products 144 on the autonomous vehicle 106 to confirm whether the autonomous vehicle 106 includes the correct products 144. If the QA worker determines that the autonomous vehicle 106 includes an incorrect product 144 or a missing product 144, then the QA worker enters an exception input indicating that the wrong product 144 was included to the autonomous vehicle 106 when fulfilling the order.

Additionally or alternatively, the orchestrator server 122 or other computing device of the system 100a (e.g., client device 152, autonomous vehicle 106) includes software programming for evaluating the products at various points of fulfilling the order and detecting exceptions in fulfilling the order. The orchestrator server 122 automatically detects the exception based upon the media data from the cameras 150 and/or product data for the particular product 144 as received from the client device 152 or as stored in the database 110.

In response to the exception indication, the orchestrator server 122 may perform any number of preconfigured responsive or remedial tasks. The information received with the exception includes one or more timestamps that the orchestrator server 122 uses to identify portions or segments of interest from each target camera's 150 media data stream. The orchestrator server 122 may transmit these segments of interest to the client device 152 of a particular worker responsible for reviewing the footage, such as the manager or QA worker. The orchestrator server 122 may store these segments into long-term storage memory (e.g., database 110, memory storage of the orchestrator server 122) for later reference according to a retention policy. In some cases, the orchestrator server 122 or database 110 stores some or all of the media data streams from one or more cameras 150 into the review queue short-term storage memory location (e.g., database 110, memory of the orchestrator server 122) according to a short term storage policy, and stores only segments of interest selected by the worker using the client device 152 into the long term storage location according to the retention policy.

Optionally, the orchestrator server 122 may instruct the subset of target cameras 150 containing footage of the product 144 associated with the exception to adjust resolution quality or other aspect of media quality of the media data generated by the cameras 150, or the orchestrator server 122 adjusts the resolution quality of the media data received from the cameras 150. In some implementations, the orchestrator server 122 maintains real-time tracking data indicating the path and position of the autonomous vehicle 106 within the warehouse 102 and may instruct the camera 150 to generate media data based upon the position of the autonomous vehicle 106. For example, when the orchestrator server 122 determines that the autonomous vehicle 106 is at a particular position (e.g., aisle, bin 111) in the warehouse 102, the orchestrator server 122 then instructs the camera 150 to generate the media data in a high resolution.

In some implementations, the media data may be stored at a resolution quality based upon whether the media data is associated with an exception. For example, the cameras 150 generate the media data at a higher resolution, which the database 110 or orchestrator server 122 may store into the short-term or long-term storage memory. If the orchestrator server 122 receives an exception associated with the media data, then the media data is stored in the higher resolution. If, however, the orchestrator server 122 does not receive an exception associated with the media data, then the orchestrator server 122 degrades the quality of the media data and stores the media data at the lower resolution.

The cameras 150 may ordinarily generate media data in a lower resolution for bandwidth and/or storage considerations, and the orchestrator server 122 may adaptively instruct the target cameras 150 to produce high-resolution media data in response to receiving or detecting an exception when the picker 112 or autonomous vehicle 106 gathers the particular product 144 or when the autonomous vehicle 106 reaches the packout station 156. As an example, the orchestrator server 122 may treat the exception as a potential exception that should be confirmed by a worker. The orchestrator server 122 receives or detects the potential exception when the product 144 is placed onto the autonomous vehicle 106 (e.g., object recognition likelihood operation), and instructs the set of target cameras 150 to increase the target cameras' 150 resolutions or other aspect of the media quality. In this example, the orchestrator server 122 may determine that the picker 112 picked the product 144 from a bin 111 that is different from an expected bin 111 based upon the object recognition or computer vision operations, and detects the potential exception. At the packout station 156 or later time, the client device 152 of the manager or QA worker may receive the segments of media data having the higher resolution for manually reviewing the segments of media data to confirm and resolve the potential exception.

Additionally or alternatively, in some implementations, the orchestrator server 122 (or other computing device) may adaptively decrease or increase the resolution of the media data received from the target cameras 150. In such implementations, the orchestrator server 122 may receive high-resolution media data from the target cameras 150, where the resolution of the target cameras 150 remains fixed. The orchestrator server 122 may reduce the resolution of the media data or camera images received from the target cameras 150. In some cases, the orchestrator server 122 may increase the resolution (e.g., does not degrade, maintains the higher resolution) of the media data in response to receiving or detecting an exception.

The orchestrator server 122 may crop visual image or video in the media data to include an area of interest in response to receiving or detecting an exception. For instance, the field of view 151 of a target camera 150 may include a view of a long aisle at high resolution. When the orchestrator server 122 receives or detects an exception occurring at one end of the aisle (and not the other end of the aisle), then the orchestrator server 122 may crop the media data to include the image or video of just the end of the aisle (or proximity distance) relative to the location of the exception. In this way, the orchestrator server 122 and target camera 150 may generate and store high-resolution media data capturing the exception, and the media data has a smaller file size compared to the file size without cropping.

In some embodiments, the target cameras 150 can be configured to output two or more streams of media data having various different resolutions and/or fields of view 151, where the orchestrator server 122 may switch between the streams of media data from the target cameras 150, based upon the a relative location of the exception received or detected by the orchestrator server 122. In this way, the orchestrator server 122 need not perform expensive operations to transcode a large volume of video or images, which facilitates system scaling. This may also improve quality if the different resolutions are each using the original raw image.

In some embodiments, the orchestrator server 122 executes one or more mitigation tasks. In response to receiving the exception, the orchestrator server 122 may transmit an alert notification to the client device 152 (e.g., mobile device) of a worker (e.g., picker 112, QA worker, manager) indicating the exception to the worker or the client device 152. The alert informs and instructs the worker to confirm whether the exception is genuine or a false positive. For instance, the orchestrator server 122 may execute the computer vision or objection recognition software routines that detect a potential exception, which triggers the orchestrator server 122 to transmit the alert to the client device 152. The alert may instruct the worker to confirm the potential exception is accurate and informs the worker that the media data segments of interest are stored into the review queue and awaiting review by the worker.

As another configuration, when a worker enters an exception to the orchestrator server 122 via the client device 152 (e.g., QA worker uploads the exception to the orchestrator server 122 at the packout station 156), the orchestrator server 122 sends a real-time alert to the client device 152 of the picker 112 who was responsible for fulfilling the order with autonomous vehicle 106. The alert indicates to the picker 112 via the GUI of the client device 152 the incorrect product 144 that the picker 112 actually picked and the correct product 144 that the picker 112 should have picked. The alert may also indicate the location 113 of the correct product 144. Alternatively, the orchestrator server 122 may transmit the alert directly to the autonomous vehicle 106, indicating a modified pick path 128 and location 113 for picking the correct product 144.

The orchestrator server 122 may update the information stored in the database 110 based upon the exception. When the picker 112 replenishes a particular bin 111, the orchestrator server 122 may receive the exception indicating that the bin 111 contains the incorrect inventory products 144. The orchestrator server 122 may determine that the product 144 was incorrectly replenished according to an automated object recognition or computer vision operation, using the media data of the one or more cameras 150 that capture footage of the picker 112 replenishing the bin 111. In some cases, the orchestrator server 122 may reassign the product data and bin 111 information in the database 110. For instance, the orchestrator server 122 updates which bin 111 a SKU is assigned to when products 144 of that SKU were replenished into the wrong bin 111.

II. Autonomous Vehicle

Figure 2A:
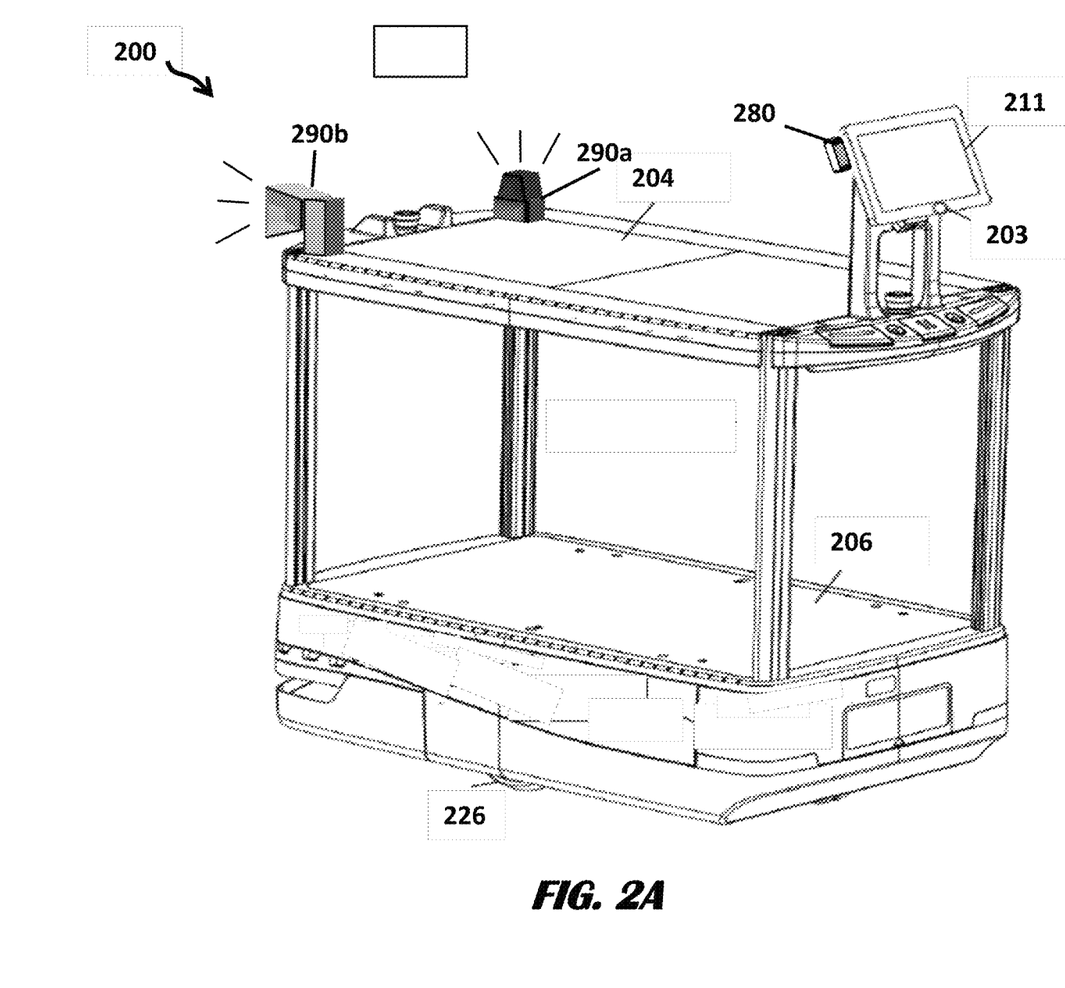
FIG. 2A shows an autonomous vehicle, according to an embodiment.

FIG. 2A shows an autonomous vehicle 200, according to an embodiment. The autonomous vehicle 200 has wheels 226, display 211, speaker 203, and two shelves 204, 206. Optionally, the autonomous vehicle 200 includes one or more cameras 280. In some instances, weighing scales (not shown) may be incorporated into the shelves 204, 206. For instance, the shelves may include pressure plates. The autonomous vehicle 200, through notifications displayed on display 211 and/or audio instructions provided via speaker 203, may notify a worker of the total weight of products on the shelves 204, 206 (e.g., the weight of the products on each shelf 204 and 206 respectively, the weight of combined shelves 204, 206) and notifications related to the exception or potential exception that indicates a missing or misplaced product. One or more totes (as described in FIG. 2C) can be, and sometimes are, transported on each of the shelves 204, 206 of the autonomous vehicle 200. The scales may have a tare feature such that the weight of totes on the scales can be zeroed. Eliminating the weight of the tote on the scale allows the orchestrator server to determine the weight of the products in the tote. The autonomous vehicle 200 further includes any number of signal lights 290a and sirens 290b (collectively referred to as autonomous vehicle annunciators 290).

While a two-shelf autonomous vehicle 200 embodiment is shown, multiple autonomous vehicle 200 configurations are possible, with some autonomous vehicles 200 being implemented using a single shelf while other autonomous vehicles 200 have two or more shelves 204, 206. Each of the totes on the autonomous vehicle 200 may have several levels (layers, zones) for storing and transporting the picked products.

The autonomous vehicle 200 may be configured to determine product dimensions. For instance, a weighing autonomous vehicle may utilize shelves 204, 206 with scales to weigh the products. Additionally or alternatively, a measuring autonomous vehicle may carry one or more measuring devices (e.g., augmented reality measurement tools, rulers, measuring tape) and/or be configured with a camera 280 (e.g., facing the shelves 204, 206 and/or facing an operator of display 211) and imaging software such that the processor (230 in FIG. 2C) on the autonomous vehicle 200 may capture and determine certain aspects of the products (e.g., dimensions, weight, expected image). For example, the processor may perform object recognition to measure the product such that the imaging processing may recognize a product and even distinguish it from a hand of a picker. In some instances, the processor may support object recognition capabilities and/or be capable of executing the image processes. The processor may determine the dimensions of the product and communicate the product dimensions to the orchestrator server 242 (e.g., orchestrator server 122 in FIG. 1A).

Additionally or alternatively, the orchestrator server may receive image data (raw data, compressed data) from the camera 280 and perform object recognition to evaluate the products placed on the autonomous vehicle 200 and detect any exceptions. The camera 280 may capture the media data and transmit the media data to the orchestrator server to perform the various image processing operations (e.g., object recognition, computer vision) for detecting exceptions, as described herein.

The autonomous vehicle 200, through visual instructions displayed on display 211 and/or audio instructions provided via speaker 203, may transmit an instruction to place one or more products on an inspection station. For example, a picker assigned to an autonomous vehicle 200 may receive instructions from the autonomous vehicle 200 to pick a product to be inspected on route to a location (e.g., such as an inspection station, a subsequent product location, etc.) Additionally or alternatively, an administrative user (using a management console), may trigger an inspection. For instance, a management console or other administrative device may transmit an instruction (via display 211, speaker 203, and/or wearable devices worn by the picker) to place one or more products on an inspection station or a packout station, place one or more products on an autonomous vehicle 200 on route to a location, and the like. If the processor of the autonomous vehicle 200 or orchestrator server may automatically detect an exception based upon the media data of the camera 280 or receive the exception entered by the reviewing worker.

A processor 230 of the autonomous vehicle 200 may monitor various timers and data inputs to detect when the autonomous vehicle 200 is delayed or progressing too slowly, based on one or more timers or time thresholds. The processor 230 of the autonomous vehicle 200 may also detect problems or potential problems with the autonomous vehicle 200. For instance, the processor 230 may determine that the amount of battery-life remaining satisfies a threshold or that the amount of time until the battery dies fails a threshold amount of time, and thus the processor 230 may have detected a problem or imminent problem with autonomous vehicle 200 fulfilling the customer's order. As another example, when the autonomous vehicle 200 waits at a particular location beyond a threshold dwell time, then the processor 230 may determine that the autonomous vehicle 200 has remained stationary for too long at the particular location and requires attention. After the processor 230 detected a problem or potential problem according to the corresponding triggering conditions, a controller 232 may trigger operations of one or more autonomous vehicle annunciators 290 (e.g., flashing the signal light 290a, sounding the siren 290b) and/or generate additional notifications, such as presenting a notification on the display 211 of the autonomous vehicle 200 or transmitting notifications to client devices of the warehouse (e.g., worker computers, worker mobile devices, orchestrator device, other autonomous vehicles).

Figure 2B:
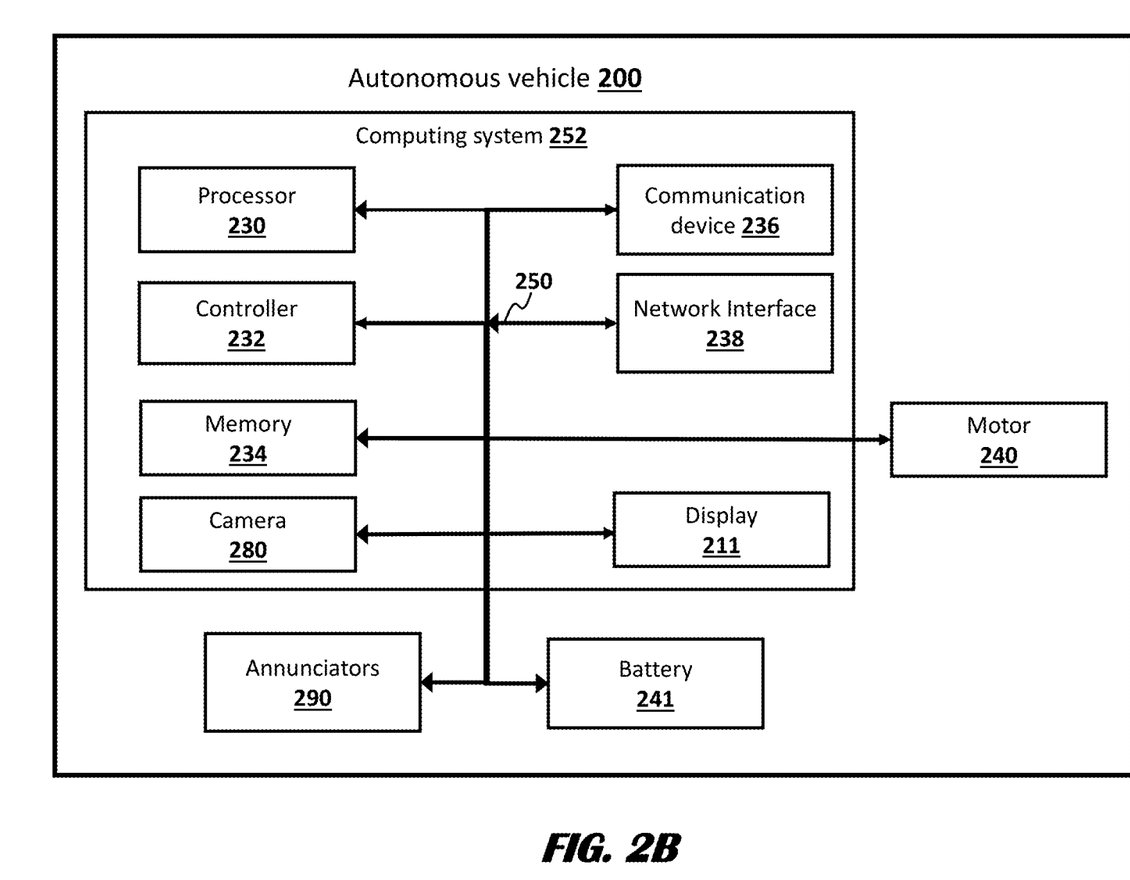
FIG. 2B shows a block diagram illustrating components of the autonomous vehicle system, according to an embodiment.

FIG. 2B shows a block diagram of the autonomous vehicle system 260 that may be used in implementing the systems and methods described herein, according to an embodiment. The computing system 252 of an autonomous vehicle 200 may include the processor 230, the controller 232, a memory 234, a communication device 236, a network interface 238, and the one or more cameras 280. The autonomous vehicle 200 may also include a motor 240, the autonomous vehicle annunciators 290, and a battery 241. Each of the components 230, 232, 234, 236, 238, 240, 280 may be interconnected, for example, using a system bus 250. General-purpose computers, network appliances, mobile devices, or other electronic systems may also include at least portions of the computing system 252.

The computing system 252 may receive and/or obtain instructions and information about the customer order (e.g., from the orchestrator server), including a list of products, the dimensions of the products, the weight of the products, characteristics of the products (a fragility score, a hazard score), the priority of the order relative to other orders, the target shipping date, the carrier pick up time, whether the order can be shipped incomplete (without all of the ordered products) and/or in multiple shipments, etc.

The controller 232 may be configured to send control signals to the motor 240 and/or other components of the autonomous vehicle 200 as described further herein. The motor 240 may be configured to convert electrical energy received from an electrical power source (e.g., battery, super capacitor) into rotations of the wheels 226. The motor 240 propels the autonomous vehicle 200 such that the autonomous vehicle 200 moves autonomously and does not require being pushed or pulled by a human or other force.

The memory 234 may store information within the computing system 252. In some implementations, the memory 234 is a non-transitory computer-readable medium. In some implementations, the memory 234 is a volatile memory unit. In some implementations, the memory 234 is a non-volatile memory unit.

The memory 234 may store warehouse operation information. The warehouse operation information may include documented product dimensions, tote capacity (e.g., weight limit, product count limit), shelf capacity (e.g., weight limit, product count limit), and bin capacity (e.g., weight limit, product count limit). The memory 234 may also store product information such as a product name, a product description, a product image, and product storage location.

The processor 230 may be capable of processing instructions for execution within the computing system 252. In some implementations, the processor 230 is a single-threaded processor. In some implementations, the processor 230 is a multi-threaded processor. The processor 230 is capable of processing instructions stored in the memory 234.

The processor 230 in the autonomous vehicle 200 (and/or the orchestrator server 122 in FIG. 1A) may control the autonomous vehicle's 200 movement to/from one location (e.g., pick location) to the next location (e.g., unloading station, subsequent pick location). The processor may be in communication with controller 232 and/or motor 240. In the event the autonomous vehicle 200 becomes associated with a different worker (e.g., a worker at an unloading station or a second picker taking over picking for the first picker), the autonomous vehicle 200 may require the second worker to log in to the autonomous vehicle 200 (e.g., via the touch screen display 211 in FIG. 2A) prior to the autonomous vehicle 200 providing guidance as to the next operation performed by the second worker.

In some implementations, at least a portion of the approaches described herein may be realized by instructions that upon execution cause one or more processing devices to carry out the processes and functions described herein. Such instructions may include, for example, interpreted instructions such as script instructions, or executable code, or other instructions stored in a non-transitory computer readable medium.

The network interface 238 may be configured to receive and transmit messages, instructions, and/or media data of the camera 280. The network interface 238 may be a wireless network interface capable of receiving commands and information from the orchestrator server and sending information (e.g., product locations) to the orchestrator server via wireless signals.

The network interface 238 may be configured to process signals from the orchestrator server and/or other autonomous vehicles in the warehouse. The network interface 238 may be, for instance, an Ethernet card, a serial communication device, e.g., an RS-232 port, and/or a wireless interface device, e.g., an 802.11 card, a 3G wireless modem, or a 4G wireless modem.

Figure 2C:
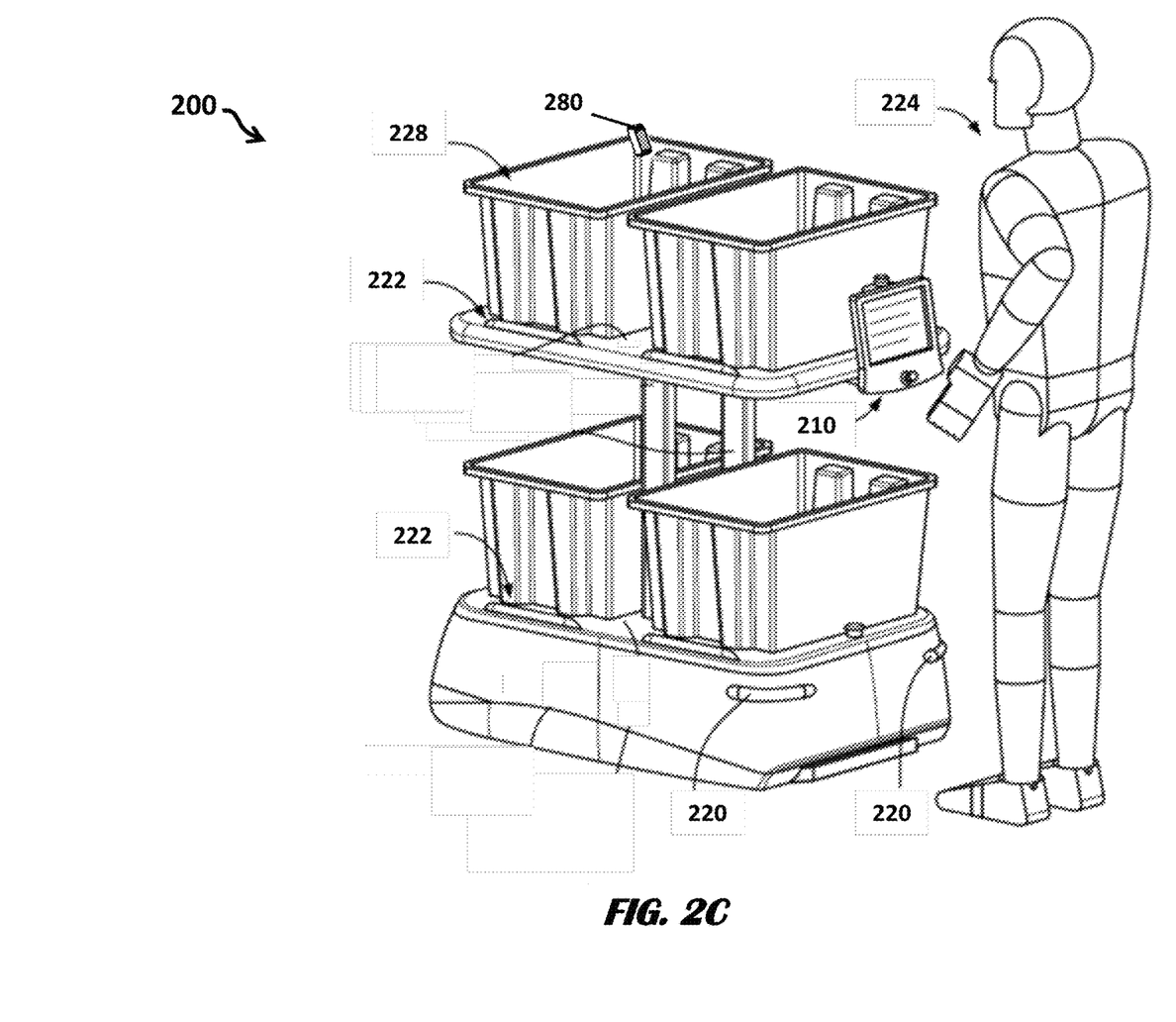
FIG. 2C shows the autonomous vehicle configured with multiple containers, according to an embodiment.

FIG. 2C shows the autonomous vehicle 200 configured with multiple containers 228 (sometimes referred to as "totes"), according to an embodiment. The autonomous vehicle 200 may display on screen 211 instructions for a picker 224. The instructions may instruct the picker 224 to travel to locations in the warehouse, search for particular bins at a particular location for particular products, and place products in the containers 228 or remove products from the containers 228 (e.g., unload at a particular bin/shelf). The picker 224 may place (or remove) the product in a particular container 228 based on lights 222, 220 indicating the particular tote. That is, the lights 222, 220 may illuminate, directing the picker 224 to place (or remove) the product in the indicated container 228. Additionally or alternatively, the display 211 may display instructions instructing the picker 224 which container 228 to place (or remove) the products.

Additionally or alternatively, one or more imaging systems (e.g., scanners) may operate in conjunction with (or replace) lights 220, 222. The imaging system may be used to measure the dimensions of products as the products enter the container and, in some embodiments, determine whether the picker 224 picked the correct product. For example, object recognition may be performed to recognize a product and determine whether the product matches to an expected product image. As discussed herein, the processor (230 in FIG. 2B) may support object recognition capabilities and/or be capable of executing the image processing operations for the media data received from the camera 280. Additionally or alternatively, the orchestrator server (122 in FIG. 1) may receive media data (raw data, compressed data) from the 280 and perform object recognition and exception detection for the products entering the containers 228. The image processing operations may confirm whether the picker 224 correctly picked the product that the picker 224 placed into the container 228. If the product is not placed into the container or the incorrect product was picked, the orchestrator server may detect an exception associated with the product.

III. Illustrative Methods of Operation

Figure 3:
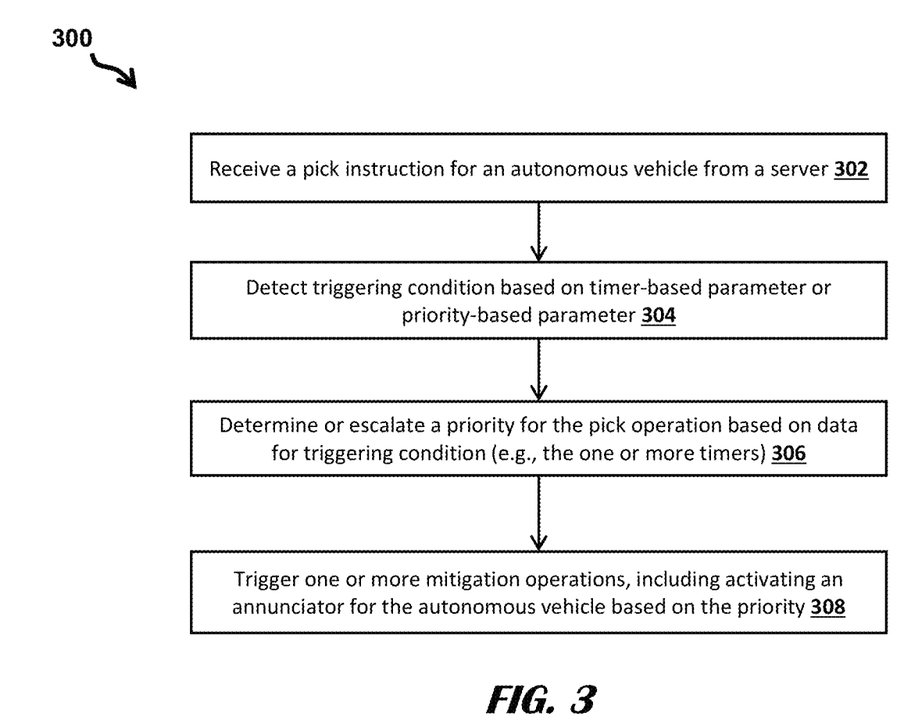
FIG. 3 shows machine-executed operations of executing a method for identifying triggering conditions with autonomous vehicles performing pick instructions.

FIG. 3 shows machine-executed operations of executing a method 300 for identifying triggering conditions with autonomous vehicles performing pick instructions. An autonomous vehicle, including various components of the autonomous vehicle, executes the steps of the method 300. The autonomous vehicle may comprise a processor, data communication hardware (e.g., wireless interface card and antenna), and one or more annunciators (e.g., light, horn), among other potential components enabling the autonomous vehicle to perform the operations and functions described herein. Although the illustrative method describes implementation by an autonomous vehicle, in some embodiments, various functions and operations may be performed by additional or alternative devices for monitoring and managing a warehouse's operations. For example, certain steps of the method 300 may be performed by a server (e.g., orchestrator server of FIG. 1) and communicate with a computing device or processor of the autonomous vehicle. As another example, the warehouse may include annunciators (e.g., warehouse annunciators) that perform certain functions of the method 300, in addition or as an alternative to the annunciators of the autonomous vehicle. In other embodiments, the various functions and operations may be performed by a combination of the autonomous vehicle and a server.

In operation 302, the autonomous vehicle may receive one or more pick instructions from a server. The autonomous vehicle may retrieve various products of the warehouse based on the pick instructions. The server may generate the one or more pick instructions for the autonomous vehicle to retrieve the products situated at various storage locations (e.g., shelves, bins) at corresponding pick locations. The pick instructions may indicate a pick path for the autonomous vehicle to traverse the warehouse autonomously, where the pick instructions instruct or otherwise cause the autonomous vehicle to follow the pick path.

The pick path may include one or more types of locations, such as a home location, a detour location, pick locations or storage locations of the products, meetup locations to rendezvous with warehouse workers, and a packout location, among others. In some cases, the autonomous vehicle may autonomously pick a product from the product's storage location. In some cases, the autonomous vehicle may meet with a worker who manually picks the product and loads the product on the autonomous vehicle. The autonomous vehicle may travel to the pick location to meet with the worker. Alternatively, the autonomous vehicle may travel to a meetup location, where the autonomous vehicle and the worker rendezvous. After meeting together, the autonomous vehicle may autonomously travel to the pick location (e.g., storage location of the product), or the work may manually operate the autonomous vehicle to navigate the autonomous vehicle to the particular pick location. When the autonomous vehicle determines the particular product was picked successfully, the autonomous vehicle may autonomously travel to the next location of the pick path to pick a next product in an order list, or the worker may continue to manually operate the autonomous vehicle to the next location.

In operation 304, the autonomous vehicle detects one or more triggering conditions, such as timer-based triggering conditions and/or priority-level conditions. The autonomous vehicle may monitor one or more timers and data inputs associated with the autonomous vehicle, as received from a worker through a computing device of the autonomous vehicle, client device, or orchestrator server. The timer-based conditions may be based on, for example, determining that a timer of the autonomous vehicle expired (e.g., timer for performing a pick instruction). The priority-based triggering conditions may be based on, for example, the priority level determined for assigned to the autonomous vehicle. The priority-based triggering conditions may also be based upon various types of data inputs as identified by the autonomous vehicle or received from a client device or orchestrator server. In optional operation 306, the server may determine the priority or escalate the priority for the pick operation based on data for one or more triggering conditions (e.g., the one or more timers).

In operation 308, the autonomous vehicle triggers notification operations and/or one or more mitigation operations based upon the timer-related condition, a priority-related condition, or other pre-configured parameters defining a triggering condition. In some embodiments, the autonomous vehicle is configured to perform the notification or mitigation operations based on detecting a timer-related condition or priority-related condition. In some embodiments, the autonomous vehicle is configured to perform notification or mitigation operations based on a dual-requirement approach or stepped approach, whereby the autonomous vehicle detects both a timer-related condition and a priority-related condition to trigger the notification operations or the mitigation operations.

In some cases, the autonomous vehicle continuously performs the notification operations (e.g., activating the annunciators) until the autonomous vehicle receive an input or instruction. For example, the autonomous vehicle may trigger the annunciators in response to determining the autonomous vehicle has remained stationary beyond a dwell timer threshold. In this example, the server may halt the annunciators when the autonomous vehicle receives an input from a picker indicating the picker has met with the autonomous vehicle and addressing the next pick on the list or addressing a problem with the autonomous vehicle.

In some embodiments, a computer-implemented method may comprise receiving, by a processor coupled to an autonomous vehicle, a pick instruction; obtaining, by the processor, a priority for the pick instruction; and triggering, by the processor, an annunciator based upon the priority obtained for the pick instruction.

In some implementations, the obtained priority is based on an accumulation of a status for the autonomous vehicle.

In some implementations, the priority is based on an expiration of a time threshold before executing the pick instruction, and the priority is obtained responsive to determining the expiration of the time threshold.

In some implementations, the priority is based on a time threshold and a packout deadline, and the priority is escalated in response to expiration of the time threshold.

In some implementations, the pick instruction indicates a meeting location for the autonomous vehicle to meet with a picker.

In some implementations, the expiration of the time threshold may correspond to the autonomous vehicle having exceeded a dwell time without executing the pick instruction.

In some implementations, triggering the annunciator includes triggering a second annunciator coupled to the second autonomous vehicle based upon the priority obtained for the pick instruction.

In some implementations, the method may further comprise halting the annunciator based upon an input received from a picker.

In some implementations, the priority is based upon a time threshold and a remaining battery charge, and the priority is escalated in response to expiration of the time threshold.

In some implementations, the method may further comprise generating a notification indicating the priority of the pick instruction of the autonomous vehicle.

In some implementations, the processor coupled to the autonomous vehicle is physically positioned in at least one of the autonomous vehicle and an orchestrator server.

In some embodiments, a system may comprise a processor coupled to an autonomous vehicle and is configured to receive a pick instruction from an orchestrator server; determine obtain a priority for the pick instruction; and trigger an annunciator based upon the priority obtained for the pick instruction.

In some implementations, the priority for the pick instruction is based upon an accumulation of a status for the autonomous vehicle.

In some implementations, the priority is based upon an expiration of a time threshold before executing the pick instruction, and the priority is obtained responsive to determining the expiration of the time threshold.

In some implementations, the priority is based upon a time threshold and a packout deadline, and the priority is escalated in response to expiration of the time threshold.

In some implementations, the pick instruction indicates a meeting location for the autonomous vehicle to meet with a picker, and the expiration of the time threshold corresponds to the autonomous vehicle having exceeded a dwell time at the meeting location without executing the pick instruction.

In some implementations, the annunciator may be positioned on a second autonomous vehicle.

In some implementations, the annunciator halts based upon an input received from a picker.

In some implementations, the priority is based upon a time threshold and a remaining battery charge, and the priority is escalated in response to expiration of the time threshold.

In some implementations, the processor may be further configured to generate a notification indicating the priority of the pick instruction of the autonomous vehicle.

In some implementations, the processor coupled to the autonomous vehicle is physically positioned in at least one of the autonomous vehicle and an orchestrator server.

In some embodiments, a non-transitory machine-readable storage medium may include computer-executable instructions stored thereon that, when executed by one or more processors, cause the one or more processors to perform operations comprising receiving, from an orchestrator server, a pick instruction; determining obtaining a priority for the pick instruction; and triggering an annunciator based upon the priority obtained for the pick instruction.

The foregoing method descriptions and the process flow diagrams are provided merely as illustrative examples and are not intended to require or imply that the operations of the various embodiments must be performed in the order presented. The operations in the foregoing embodiments may be performed in any order. Words such as "then," "next," etc. are not intended to limit the order of the operations; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The operations of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer-implemented method comprising:
   receiving, by a processor coupled to an autonomous vehicle, a pick instruction;
   obtaining, by the processor, a priority for the pick instruction; and
   triggering, by the processor, an annunciator based upon the priority obtained for the pick instruction,
   wherein triggering the annunciator includes triggering a second annunciator coupled to the second autonomous vehicle based upon the priority obtained for the pick instruction, and
   wherein the priority is based upon a time threshold and a remaining battery charge, and wherein the priority is escalated in response to expiration of the time threshold.

2. The method according to claim 1, wherein the obtained priority is based on an accumulation of a status for the autonomous vehicle.

3. The method according to claim 1, wherein the priority is based on an expiration of a time threshold before executing the pick instruction, wherein the priority is obtained responsive to determining the expiration of the time threshold.

4. The method according to claim 1, wherein the priority is based on the time threshold and a packout deadline, and wherein the priority is escalated in response to expiration of the time threshold.

5. The method according to claim 1, wherein the pick instruction indicates a meeting location for the autonomous vehicle to meet with a picker.

6. The method according to claim 1, wherein the expiration of the time threshold corresponds to the autonomous vehicle having exceeded a dwell time without executing the pick instruction.

7. The method according to claim 1, further comprising halting the annunciator based upon an input received from a picker.

8. The method according to claim 1, further comprising generating a notification indicating the priority of the pick instruction of the autonomous vehicle.

9. The method according to claim 1, wherein the processor coupled to the autonomous vehicle is physically positioned in at least one of the autonomous vehicle and an orchestrator server.

10. A system comprising:
a processor coupled to an autonomous vehicle and configured to:
receive a pick instruction;
obtain a priority for the pick instruction; and
trigger an annunciator based upon the priority obtained for the pick instruction,
wherein triggering the annunciator includes triggering a second annunciator coupled to the second autonomous vehicle based upon the priority obtained for the pick instruction, and
wherein the priority is based upon a time threshold and a remaining battery charge, and wherein the priority is escalated in response to expiration of the time threshold.

11. The system according to claim 9, wherein the priority for the pick instruction is based upon an accumulation of a status for the autonomous vehicle.

12. The system according to claim 9, wherein the priority is based upon an expiration of the time threshold before executing the pick instruction, wherein the priority is obtained responsive to determining the expiration of the time threshold.

13. The system according to claim 9, wherein the priority is based upon the time threshold and a packout deadline, and wherein the priority is escalated in response to expiration of the time threshold.

14. The system according to claim 9, wherein the pick instruction indicates a meeting location for the autonomous vehicle to meet with a picker, and wherein the expiration of the time threshold corresponds to the autonomous vehicle having exceeded a dwell time at the meeting location without executing the pick instruction.

15. The system according to claim 9, wherein the annunciator is positioned on a second autonomous vehicle.

16. The system according to claim 9, wherein annunciator halts based upon an input received from a picker.

17. The system according to claim 9, wherein the processor is further configured to generate a notification indicating the priority of the pick instruction of the autonomous vehicle.

18. The system according to claim 1, wherein the processor coupled to the autonomous vehicle is physically positioned in at least one of the autonomous vehicle and an orchestrator server.

19. A non-transitory machine-readable storage medium having computer-executable instructions stored thereon that, when executed by one or more processors, cause the one or more processors to perform operations comprising:
receiving, from an orchestrator server, a pick instruction;
obtaining a priority for the pick instruction; and
triggering an annunciator based upon the priority obtained for the pick instruction,
wherein triggering the annunciator includes triggering a second annunciator coupled to the second autonomous vehicle based upon the priority obtained for the pick instruction, and
wherein the priority is based upon a time threshold and a remaining battery charge, and wherein the priority is escalated in response to expiration of the time threshold.

* * * * *